Jan. 18, 1972  WATARU SHIRATORI  3,635,858
PATTERN PAINT
Filed Aug. 8, 1969
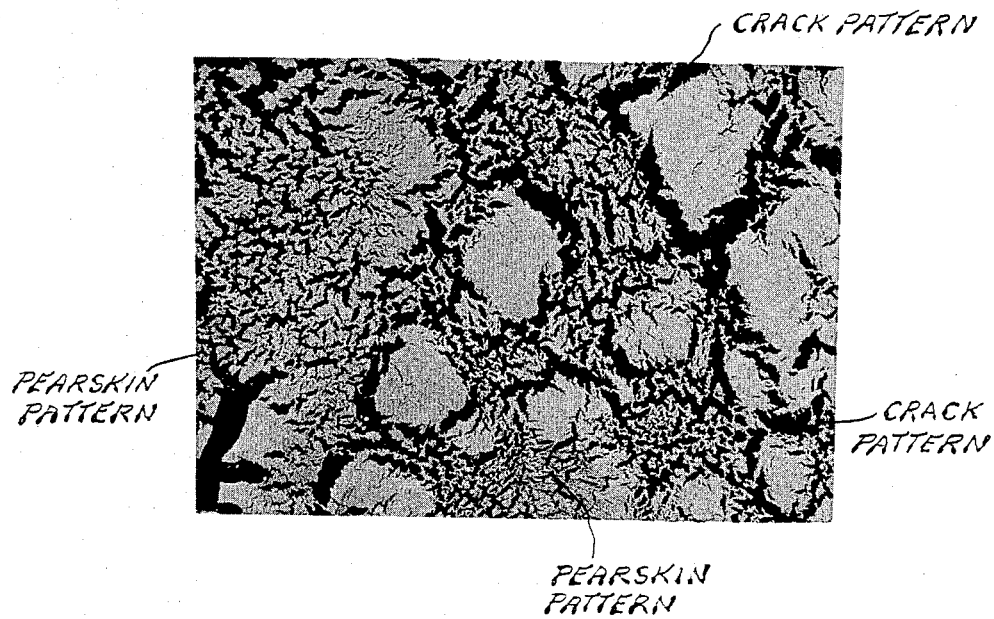
INVENTOR
WATARU SHIRATORI

United States Patent Office 3,635,858
Patented Jan. 18, 1972

3,635,858
PATTERN PAINT
Wataru Shiratori, Ichikawa-chi, Japan, assignor to Toyo Kasei Co., Ltd., Tokyo, Japan
Filed Aug. 8, 1969, Ser. No. 848,569
Claims priority, application Japan, Aug. 9, 1968,
43/56,127
Int. Cl. C09d 3/64, 3/72, 5/28
U.S. Cl. 260—22 R
4 Claims

ABSTRACT OF THE DISCLOSURE

A paint for producing graceful intermingled patterns of pearskin patterns and crack patterns formed by applying the paint on an undercoat painted on any article to be painted, said paint being composed of zinc stearate, organic solvents and synthetic resin consisting of polyvinyl chloride or polyester, the undercoat being formed by applying the same or similar resin as contained in the said paint, the formation of patterns being caused by the ionizing action of zinc stearate and different evaporating velocities of the organic solvents.

---

This invention relates to a paint for producing intermingled patterns of pearskin patterns and crack patterns of unlimited varieties in shapes on the surface of any article to be painted such as lether, paper, plywood, metal sheet, ceiling, wall and floor in building works and the like.

The paint of the present invention is characterized by containing a relatively large amount of zinc stearate which is easy to ionize and expand in organic solvents so that intermingled patterns of pearskin patterns and crack patterns may be formed on the surface of an article to be painted when zinc stearate is dispersed, by utilizing different evaporating velocities of organic solvents such as aromatic hydrocarbons, ketones and esters.

A conventional cracking lacquer which is known as cracking paint is based on the idea of utilizing the fluidity of aluminium stearate. However, as the fluidity and shrinkage thereof are small, there occur only crackings of low degree. Further, as it lacks alkali resistance, softness and elasticity, it is defective in that due to the expansion of the painted article by the absorption of moisture from the back surface of the article and the shrinkage thereof by drying, the paint is likely to be deprived of the elasticity and durability and easily peels off. Therefore, it is used today only for some metals.

In the present invention, when the solvents are evaporated, zinc stearate reacts ionically and pigments added to the paint are dispersed, following zinc stearate and due to the difference in the evaporating velocities of the solvents are formed patterns of various varieties, that is, the solvent high in the evaporating velocity disperses zinc stearate finely to form so-called pearskin pattern, while the solvent low in the evaporating velocity develops large and small cracks due to the shrinkage of zinc stearate, whereby large and small crack patterns of chemical designs are formed.

The paint of the present invention is prepared by mixing 35 to 40 wt. percent of synthetic resin such as polyvinyl chloride or polyester, 12 to 18 wt. percent of zinc stearate and 42 to 53 wt. percent of a mixed solvent composed of at least two compounds selected from the group consisting of xylene and toluene as aromatic hydrocarbons, acetone, methyl ethyl ketone (MEK) and methyl iso-butyl ketone as ketones and ethyl acetate and butyl acetate as esters. One of preferable examples of the paint of the present invention is the composition of 38 wt. percent of synthetic resin, 14 wt. percent of zinc stearate and 48 wt. percent in total of the mixed solvent consisting of acetone, methyl ethyl ketone, ethyl acetate and xylene.

The synthetic resin to be used for preparing the above-mentioned paint is chosen according to the particular use of the article to be painted. For example, in the case of painting an alkali-containing article, polyvinyl chloride is preferable and in the case of painting materials which require the softness and elasticity such as leather, nonwoven fabric and paper, polyester is preferable.

In painting any article with the paint of the present invention, the article is painted at first with a synthetic resin of the same kind as used for preparing the paint of the present invention. When applying then the paint of the present invention on the surface of the undercoat, the film of the undercoat is dissolved and the paint is largely fluidized and shrunk on account of the ionizing action of zinc stearate, resulting in the formation of large and small crack patterns. On the other hand, pearskin patterns are formed due to different evaporating velocities of different organic solvents contained in the paint, while zinc stearate being dispersed by the solvents. Thus, graceful intermingled patterns of pearskin patterns and crack patterns may be formed on the surface of an article to be painted by the application of the paint of the present invention.

Further, if any pigments are added to the paint of the present invention colored patterns of unlimited varieties may be produced by the combination of the color of the undercoat and the arranged color of the pattern paint of the present invention.

The drawing shows an example of patterns produced by the application of the paint with an addition of pigment of the present invention onto the surface of an undercoat of polyvinyl chloride enamel, in which graceful patterns are formed by the arrangement of colors.

As well known, in the case of any conventional paint, there occur often phenomena of cracking and peeling-off within one or two years after it is applied, on account of the shrinkage of the surface film by the aging of the binder. On the other hand, in the present invention as the synthetic resin of the undercoat and the resin of the pattern paint or the same kind as that of the undercoat are fused with each other to form a paint film which firmly adheres to the surface of an article to be painted, showing chemical patterns of pearskin patterns and crack patterns of various sizes and shapes, while the paint is dispersed, fluidized and shrunk due to the ionizing action of zinc stearate. The undercoat resin may be different from that of the paint if it has similar solubility characteristics.

Thus, according to the present invention graceful patterns can be easily formed by using any of such applying methods as brush-painting, spraying, flow coating and roll-coating on a mortar, plaster, alkali-containing article or board for ceiling, wall or floor in building works or on paper, cloth, leather, plywood, metal sheet, plastics, synthetic fibers and nonwoven fabrics.

What is claimed is:

1. A paint for producing intermingled patterns of pearskin patterns and crack patterns of various sizes and shapes on an undercoated surface of an article to be coated, consisting essentially of 35 to 40 wt. percent of a synthetic resin selected from the group consisting of polyvinyl chloride and polyester, 12 to 18 wt. percent of zinc stearate and 42 to 53 wt. percent in total of a mixed solvent consisting of acetone, methyl ethyl ketone, ethyl acetate and xylene.

2. The paint claimed in claim 1 to which a pigment is added.

3. A process for producing intermingled patterns of pearskin patterns and crack patterns, comprising applying to a substrate an undercoat consisting essentially of a synthetic resin selected from the group consisting of polyvinyl chloride and polyester and subsequently applying to said undercoat the paint of claim 1.

4. A process for producing intermingled patterns of pearskin patterns and crack patterns, comprising applying to a substrate an undercoat consisting essentially of a synthetic resin selected from the group consisting of polyvinyl chloride and a polyester and subsequently applying to said undercoat the paint of claim 2.

References Cited
UNITED STATES PATENTS

| | | | |
|---|---|---|---|
| 1,846,869 | 2/1932 | Hoffman | 117—41 |
| 2,671,063 | 3/1954 | Waldie | 260—22 |
| 2,809,121 | 10/1957 | Davis et al. | 106—243 |
| 2,972,590 | 2/1961 | Cunder et al. | 260—18 |
| 3,149,994 | 9/1964 | Congleton et al. | 117—45 |
| 3,214,286 | 10/1965 | Ramberger | 117—41 |
| 3,338,857 | 8/1967 | Shur et al. | 260—29.4 |

DONALD E. CZAJA, Primary Examiner

R. W. GRIFFIN, Assistant Examiner

U.S. Cl. X.R.

117—41, 161 K, 161 R; 260—23 XA, 31.2 R, 31.2 XA, 32.8 R, 36.6 R, 33.6 UA